United States Patent
Chen et al.

(10) Patent No.: US 6,756,934 B1
(45) Date of Patent: Jun. 29, 2004

(54) TARGET SHADOW DETECTOR FOR SYNTHETIC APERTURE RADAR

(75) Inventors: Joe C. Chen, Torrance, CA (US); Albert Ezekiel, Los Angeles, CA (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 10/633,284

(22) Filed: Aug. 1, 2003

(51) Int. Cl.[7] .......................... G01S 13/04; G01S 13/90

(52) U.S. Cl. ............................ 342/89; 342/13; 342/14; 342/16; 342/25; 342/27; 342/28; 342/90; 342/175; 342/195

(58) Field of Search ........................... 367/87, 93, 94, 367/117, 118, 124–126, 135, 136; 342/13–20, 25, 26–28, 52–59, 89–91, 93, 175, 176, 179, 180, 159–164, 190–197; 382/276–292

(56) References Cited

U.S. PATENT DOCUMENTS

| | | | | |
|---|---|---|---|---|
| 4,768,156 A | * | 8/1988 | Whitehouse et al. | 382/279 |
| 4,811,308 A | * | 3/1989 | Michel | 367/136 |
| 4,965,582 A | * | 10/1990 | Hellsten | 342/25 |
| 5,262,781 A | * | 11/1993 | Evans | 342/25 |
| 5,717,401 A | * | 2/1998 | Sabet-Peyman et al. | 342/192 |
| 5,990,822 A | * | 11/1999 | Honigsbaum | 342/90 |
| 6,222,479 B1 | * | 4/2001 | Honigsbaum | 342/13 |
| 6,259,396 B1 | * | 7/2001 | Pham et al. | 342/90 |

OTHER PUBLICATIONS

S.W. Leung et al., "A Shadow Feature Signal Processing Algorithm for Radar Systems"; Transactions of the China 1991 International Conference on Circuits and Systems (Shenzhen, China); pp. 452–455.*

S.W. Leung et al., "A Fuzzy Shadow Feature Scheme for Radar Signal Detection"; Proceedings of the International Conference on Information, Communications, and Signal Processing ICICS '97 (Singapore, 1997); pp. 1386–1388.*

V.V. Chapurskiy et al., "SISAR: Shadow Inverse Synthetic Aperture Radiolocation"; Proceedings of the IEEE International Radar Conference (the year 2000); pp. 322–328.*

* cited by examiner

*Primary Examiner*—Bernarr Earl Gregory
(74) *Attorney, Agent, or Firm*—Leonard A. Alkov

(57) ABSTRACT

Targets imaged by radar systems typically have shadows associated with them. Target detection and identification is enhanced by analyzing the shadow characteristics of a suspected target. Features of the shadow cast by the suspected target enhance the identification process. Authenticating the suspected target shadow as being indeed cast by the target comprises a) Generating a radar image using radar returns, the radar image containing both the target and its suspected target shadow;

b) Forming a pentagonal perimeter adjacent to the target (within the radar image), the pentagonal perimeter chosen to contain the suspected target shadow, the pentagonal perimeter separating the target from its suspected target shadow;

c) Testing the suspected target shadow within said pentagonal perimeter to authenticate that the suspected target shadow is cast by the target.

One aspect of the testing performed on the suspect target shadow uses a 2 by 2 dilation and majority filter. Other tests performed are an adjacent overlap test, an edge pixel count test, a maximum area and minimum distance test as well as an area threshold test.

The original radar image is converted to a magnitude only form from its I and Q components and a magnitude thresholding is applied to the radar image to obtain a binary image.

14 Claims, 4 Drawing Sheets

TARGET SHADOW DETECTOR FOR SYNTHETIC APERTURE RADAR

BACKGROUND OF THE INVENTION

1. Field of Invention

The present invention relates generally to radar target detection and identification using Synthetic Aperture Radar (SAR) images. More specifically, the present invention relates to an improved method and apparatus for detecting target shadows to improve the performance of target identification.

2. Description of the Related Art

Radar target detection and identification have been proven to be very effective in military surveillance, reconnaissance, and combat missions. The detection and identification of targets provide real-time assessment of the number and the locations of the targets of interest. One method of target detection and identification is to process the image acquired by the radar using the Synthetic Aperture Radar (SAR) technology. By processing the SAR image, the features of a target can be extracted and matched to a database for identification. One distinct feature of a target is the shadow cast by the target. When the shadow is present, more target features can be used to increase the probability of correct identification.

Synthetic Aperture Radar (SAR) is used for ground mapping as well as target identification. The general principle behind SAR is to coherently combine the amplitude and phase information of radar returns from a plurality of sequentially transmitted pulses using a relatively small antenna on a moving platform. Synthetic Aperture Radar (SAR) systems have been developed to acquire images of stationary objects by coherently integrating phase history from multiple pulse returns. High resolution maps are achieved by coherently combining return signals reflected from transmitted pulses in the cross range direction. Formation of focused SAR images or maps requires accurate information on platform position and velocity to coherently combine pulse returns from multiple pulses. The process of aligning pulses for coherent combination is referred to as motion compensation, and is usually performed with the raw radar data, at the early stage of image formation process. The plurality of returns generated by the transmitted pulses along a known path of the platform make up an array length. During the array length, amplitude as well as phase information returned from each of the pulses, for each of many range bins, is preserved, forming a SAR image. The SAR image is formed from the coherent combination of the amplitude and phase of return(s) within each range bin, motion compensated for spatial displacement of the moving platform during the acquisition of the returns for the duration of the array length. Because of the high precision required for this process, sometimes background noise and ground scatter can make certain range bins or pixels within the image shift value by large amounts, creating an effect similar to snow on a television image.

For a relatively tall radar target on the ground, certain range bins will be obscured because the target's height will create a shadow from the radar energy emitted by the transmitter. That is, no radar energy will be returned from those range bins in the shadow of the tall target. This shadow, present in certain range bins, indicates features of the tall target casting the shadow. Features of the shadow, and its relationship to the target itself, can be used to further identify the target casting the shadow. Unfortunately, ground features such as roads also reflect little radar energy, and thus look like shadows. What is a target shadow and what is only a low radar energy reflectance ground feature unrelated to a target may not be clearly discernible.

Interpreting shadows in SAR imagery has been described in *Knowledge-based Segmentation of SAR Data with Learned Priors*, IEEE transactions on Image Processing, vol 9, no 2, pp 299–301, February 2000, which uses Bayes' rule to segment the target, the shadow and background terrain pixels, given prior knowledge of the intensity distribution of each class and the prior probability that a particular pixel belongs to a certain class. Another interpretation of shadows in SAR imagery is described in *Reconstruction of Man Made Objects from High Resolution Radar Images*, in Proceedings of IEEE Aerospace Conference, vol 3, March 2000, pp 287–292. Here, a threshold operation is used in conjunction with morphological steps to perform segmentation of the shadow region.

Similar efforts at working with radar shadows are described in U.S. Pat. No. 6,259,396, filed Aug. 26, 1999, titled *Target acquisition system and Randon transform based method for target azimuth aspect estimation* incorporated herein by reference in its entirety.

Prior art efforts have sometimes failed at reliably detecting the shadow of a target and associating the shadow with the target itself. Because of this, false alarm rates are relatively high, failing to correctly identify target types.

SUMMARY OF THE INVENTION

Above limitations are solved by the present invention by method and apparatus for using a Synthetic Aperture Radar (SAR) system for authenticating that a suspected target shadow is cast by a target. The method comprises the steps of:

a) generating a radar image using radar returns from said SAR, said radar image containing both the target and its suspected target shadow;

b) forming a pentagonal perimeter adjacent to the target (within the radar image), the pentagonal perimeter chosen to contain the suspected target shadow. The pentagonal perimeter separates the target from its suspected target shadow; and c) testing the suspected target shadow within said pentagonal perimeter to authenticate that said suspected target shadow is cast by said target.

One aspect of the testing performed on the suspected target shadow uses a 2 by 2 dilation and majority filter. Other tests performed are an adjacent overlap test, an edge pixel count test, a maximum area and minimum distance test as well as an area threshold test.

The original radar data is converted to a magnitude only form from its I and Q components and a magnitude thresholding is applied to the radar image to obtain a binary image therefrom, said binary image facilitating shadow region identification.

DETAILED DESCRIPTION

The present invention describes an apparatus and method of authenticating shadow of a radar target as belonging to a particular target.

Figure 1:
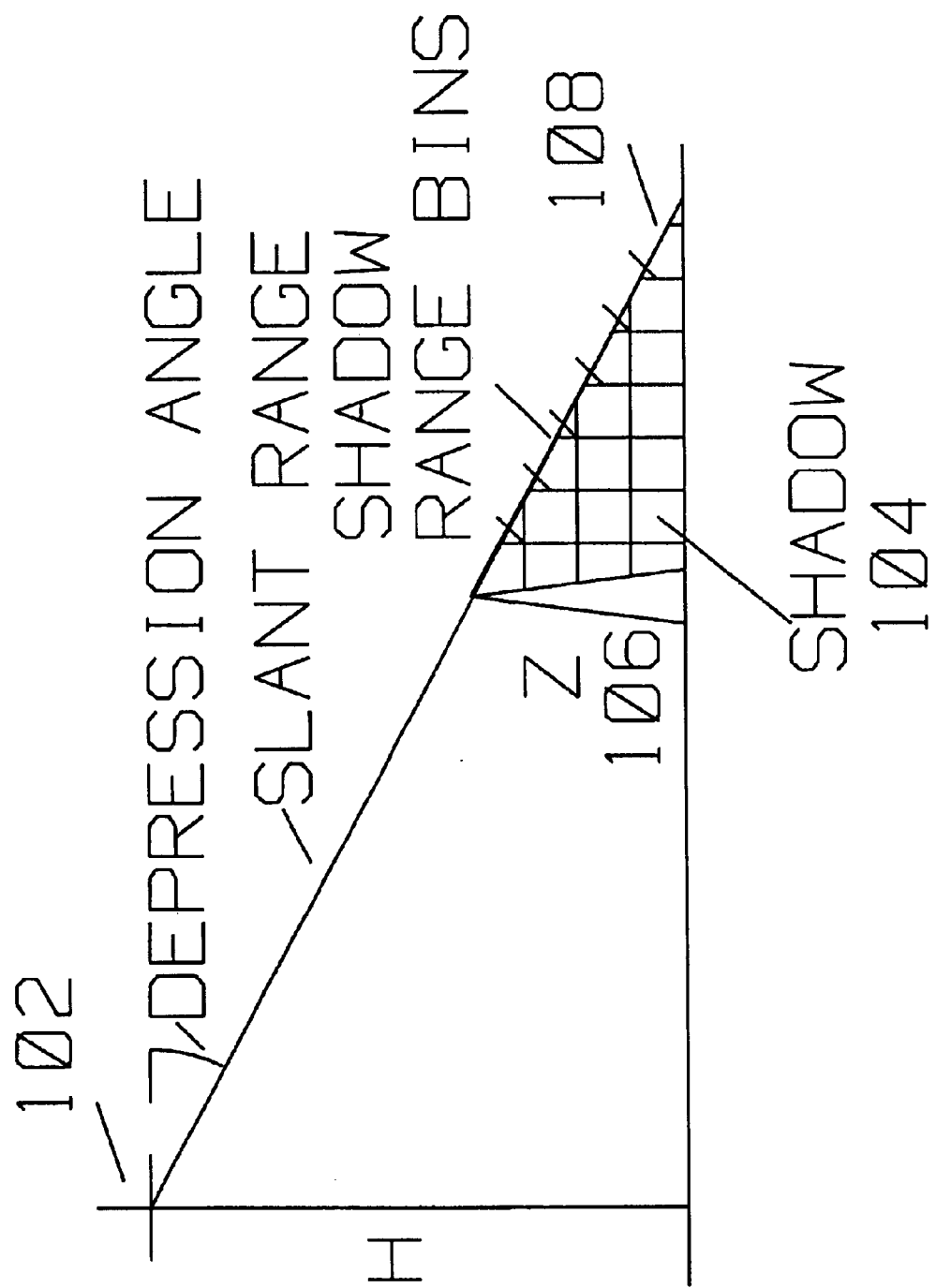
FIG. 1 shows the relationship between an airborne SAR radar, a ground target and its associated shadow induced by the ground target.

FIG. 1 shows a typical geometry between an airborne moving radar 102, a ground target 106 and its associated target shadow 104. The characteristics of shadow 104 are determined by a tall target 106. Target 106 casts a shadow 104 over the X, Y plane. Moving platform 102 is at an altitude H above the X, Y plane. Target 106 has height Z above the X, Y plane. Target 106 casts a shadow 104 for all slant range bins beyond where the vertical extent of target 106 intersects the slant range direction from moving platform 102, including range bin 108. Shadow 104 arises from the lack of radar returns (shadow) from range bins beyond where target 106 intersects the slant range. Moving radar 102, at height H above plane X,Y, points its radar antenna at a depression angle shown to illuminate target 106.

Figure 2:
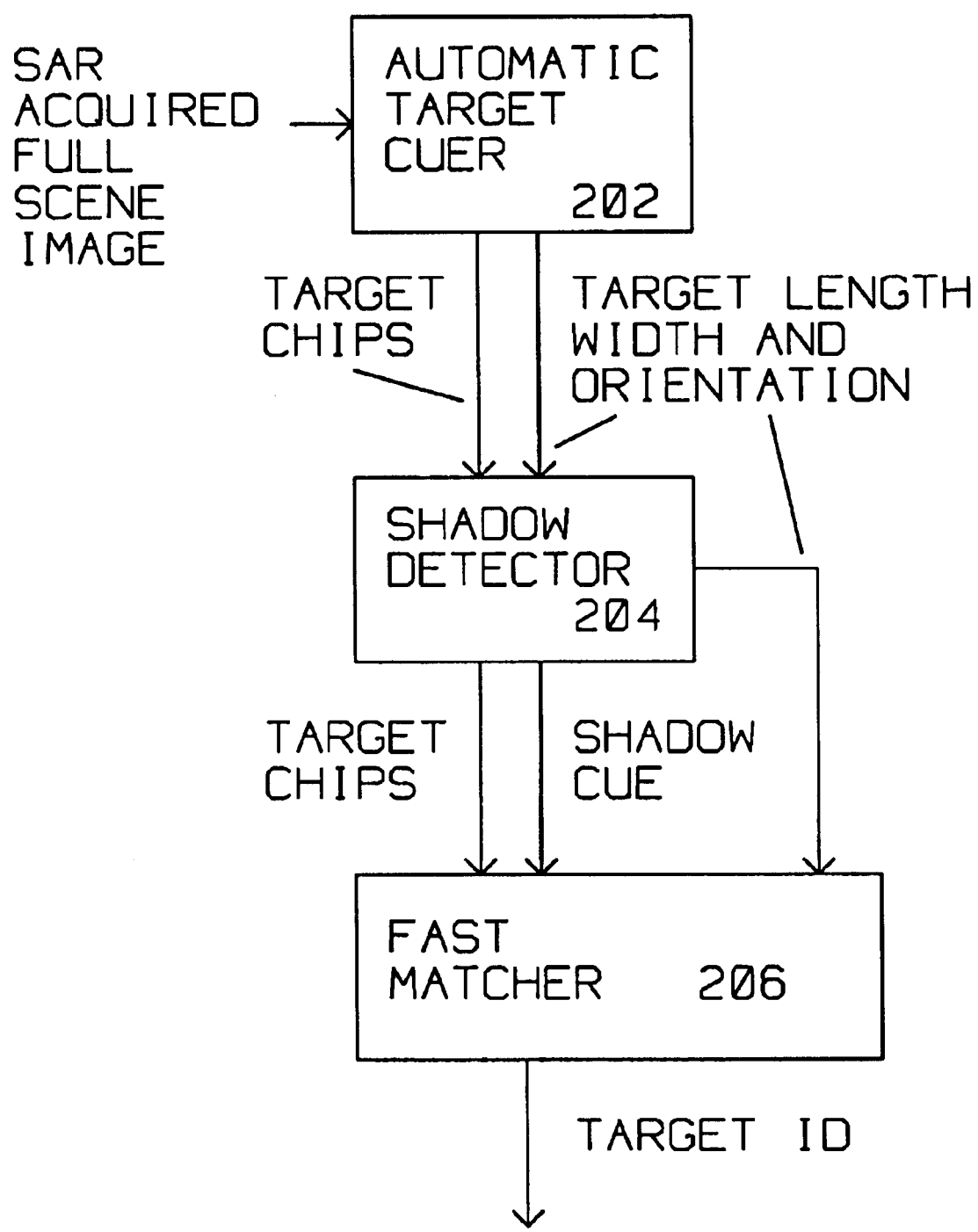
FIG. 2 describes the signal flow within a target detection system including the shadow detector used in the present invention.

The present invention discloses an algorithm to authenticate a suspected radar shadow as cast by a particular target. The suspected shadow is extracted from an image chip acquired using a Synthetic Aperture Radar (SAR), Interferometric SAR (IFSAR), or real beam radar, then, utilizing an Automatic Target Recognition system (ATR) to extract both target and suspected shadow. That is, the radar paints a plurality of targets and associated suspected shadow(s), and the ATR classifies radar returns as targets and shadows using various methods. Shown in FIG. 2 are the links of the shadow detector with other components of the ATR system, such as Automatic Target Cuer (ATC) and Fast Matcher. Given a full scene of radar return data acquired and digitized with SAR from exemplary platform 102, ATC 202 will extract targets of interest. An example of an ATC is given in U.S. Pat. No. 6,259,396 to Q. H. Pham et. al. titled *Target Acquisition System and Random Transform Based Method for Target Azimuth Aspect Estimation*, incorporated herein by reference in its entirety. ATC 202 typically uses a multistage process to detect targets within a scene and provide as an output, for example: target chips, target length L, target width W and target orientation (θ) with respect to the scene coordinates. Shadow detector 204 takes the individual chips identified by ATC with the estimated target information to yield a shadow cue, typically for each chip. The shadow cue, or suspected shadow, enables adaptive switching of the match metric in Fast Matcher 206. An example of a Fast Matcher 206 to be used with this invention is described in *Real Time Model Based Automatic Recognition* by M. Burke and G. Ettinger, in Proceedings of Combat Identification Systems Conference, Colorado Springs, Colo., Jun. 3–7, 2002, incorporated herein by reference in its entirety. The Fast Matcher 206 is further improved by methods described in *Operational Considerations for the AGRI SAR ATR on Strike Aircraft* by A. Ezekiel, et al, in Proceedings of Combat Identification Systems Conference, Colorado Springs, Colo., Jun. 3–7, 2002, incorporated herein by reference in its entirety.

Figure 3:
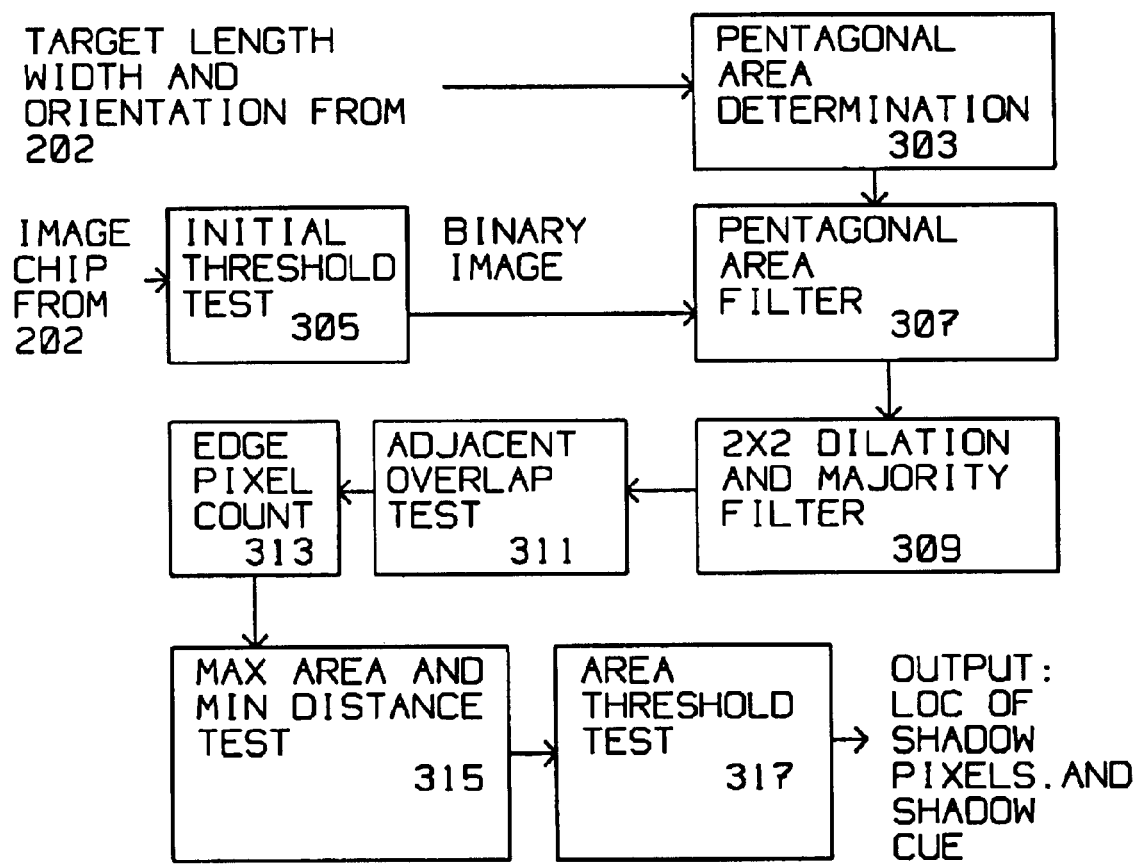
FIG. 3 describes the details of shadow detection 204 in FIG. 2 for signal processing in accordance with the present invention to authenticate a suspected shadow cast by a target.

FIG. 3 describes the flow diagram for the use of parameters generated ATC 202 of FIG. 2 for shadow processing. Target chips from ATC 202 are used in initial threshold test 305 to generate a binary image. These chips have 128 by 128 pixels for antenna depression angles greater or equal to 13 degrees. For depression angles less than 13 degrees, non square chips of 128 by 256 pixels are used, to account for extended shadow regions in far range. Using a public domain data base example, such as the Moving and Stationary Target and Acquisition (MSTAR) data base, the sampling is 3 pixels for every 2 feet. Therefore, for MSTAR, above square chips of 128 by 128 pixels correspond to an area of 85 by 85 feet.

Initial threshold test 305 compares the amplitude value of each pixel within the chip for a first pass determination of shadow pixels. Since SAR images are derived from radar signals, conversion from I and Q to magnitude is performed to convert the signal to a 256 level gray scale. Then, the mean $\mu$ of the image gray scale is computed. For a 128 by 256 chip, only the 128 by 128 half closer to the moving radar platform is used to compute the mean $\mu$. For SAR images, $\mu$ approximates the clutter power for homogeneous ground clutter. A typical clutter to noise ratio (CNR) of 6 dB, corresponds to 24 gray scale intensity for 4 gray scale levels, translating to 1 dB of CNR. The threshold for shadow intensity is set at $\mu-24$ for typical MSTAR images. Then, a majority sliding 3×3 window is used to determine whether the center pixel corresponds to a potential shadow pixel. That is, if 5 or more of the nine pixels surrounding the pixel being analyzed are below the threshold $\mu-24$, the pixel is declared to be a shadow pixel, i.e. set to 1. Performing this thresholding for all pixels within the chip produces a binary image where 1's denote passing the majority test.

Estimated target length L, width W, and orientation θ from FIG. 2 are presented to pentagonal area determination 303. The binary image computed in threshold 305 is combined with pentagonal area determination 303 results in pentagonal area filter 307. The pentagonal area determination 303 and pentagonal area filter 307 are further detailed in FIG. 4, as discussed below. For each 128 by 128 chip, the target centroid is placed at the center of the image. For each non-square target, chip of 128 by 256, the target centroid is placed at the center of the lower part of the image, that is closer to the moving platform acquiring the target. Target shadow can only exist behind the target, away from the moving platform where the radar transmitter is located along the range direction.

Pentagonal Area Determination-303

Figure 4:
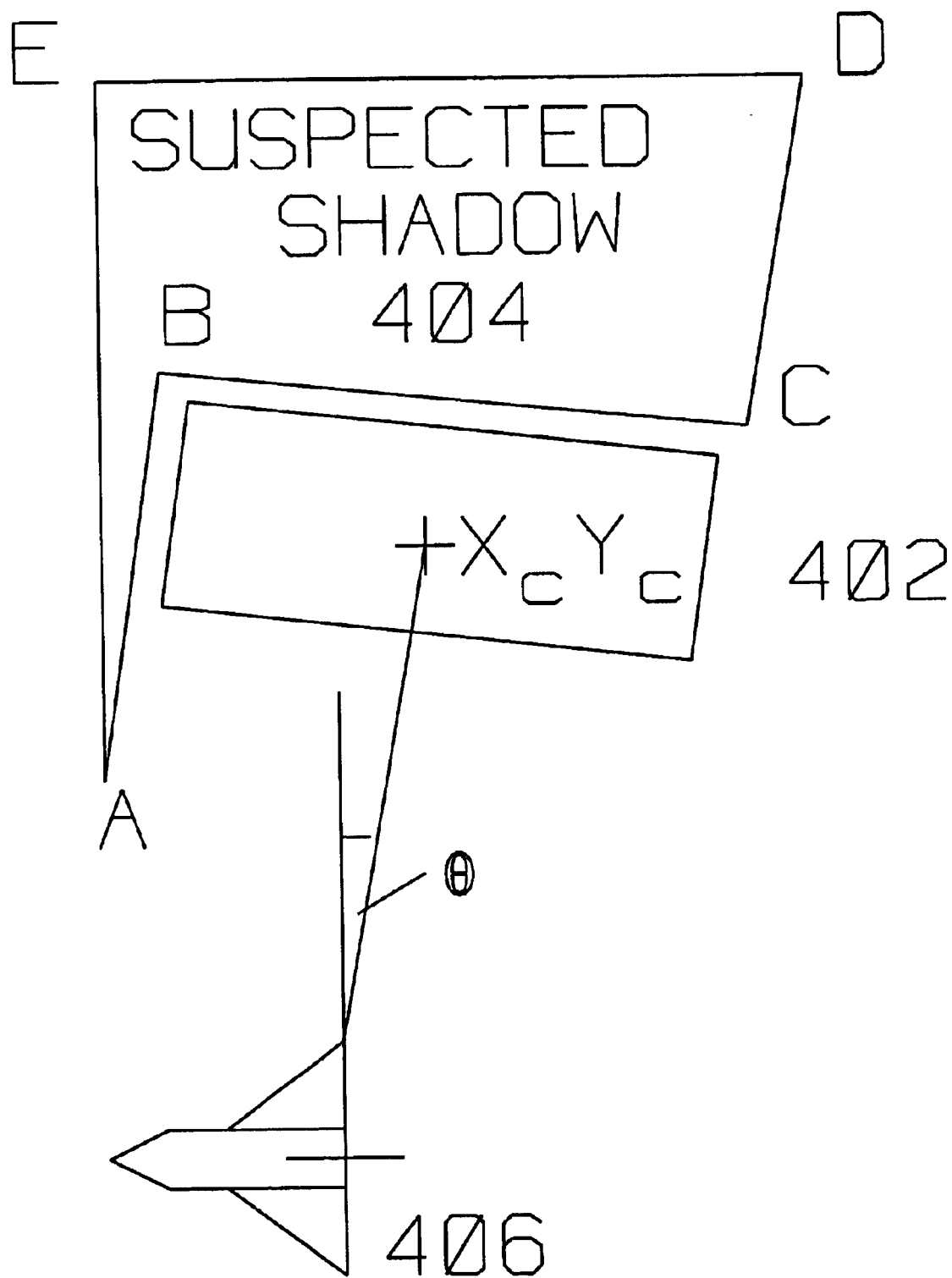
FIG. 4 describes the use of a pentagonal area having a pentagonal perimeter encircling the suspected shadow area, adjacent to the target, for use within the present invention.

As shown in FIG. 4, the width of a target 402 is W, its length as L, and its orientation with respect to North as θ. Suspected shadow 404 is separated from its target 402 by perimeter A,B,C,D,E. Moving platform 206 is located opposite the suspected shadow area 204, illuminating target 402. The four vertices of the target 402 (rectangle) with the target centroid $x_c$, $y_c$ as the origin are given by:

$$x_1^c = W/2 \cdot \cos(\theta) + L/2 \cdot \sin(\theta),\ y_1^c = -W/2 \cdot \sin(\theta) + L/2 \cdot \cos(\theta) \quad (1a)$$

$$x_2^c = -W/2 \cdot \cos(\theta) + L/2 \cdot \sin(\theta),\ y_2^c = W/2 \cdot \sin(\theta) + L/2 \cdot \cos(\theta) \quad (1b)$$

$$x_3^c = -W/2 \cdot \cos(\theta) - L/2 \cdot \sin(\theta),\ y_3^c = W/2 \cdot \sin(\theta) - L/2 \cdot \cos(\theta) \quad (1c)$$

$$x_4^c = W/2 \cdot \cos(\theta) - L/2 \cdot \sin(\theta),\ y_4^c = -W/2 \cdot \sin(\theta) - L/2 \cdot \cos(\theta) \quad (1d)$$

Translating the above four points to the image origin, i.e. the upper left hand corner with positive x toward East, and positive y down, towards South, with target centroid at $x_c$, $y_c$, the four points are given by $$x_n = x_c + x_n^c,\ y_n = y_n - y_n^c \text{ for } n=1, 2, 3, 4 \quad (2)$$

For a 128 by 128 pixel chip, $x_c$, $y_c$=(64, 64), while $x_c$, $y_c$=(64, 192) for a 128 by 256 chip. The above four points then define the five lines that bound the pentagonal area, A,B,C,D,E in FIG. 4, separating the target 402 from its suspected shadow 404. The same four points also define the East boundary of the pentagon as $$x_E = ceil(max(x_n) + tol)$$

and the West boundary as $$x_W = floor(min(x_n) - tol)$$

where ceil(·) is a round up operation and floor(·) is a round down operation tol is the tolerance in case of underestimation of the target area.

The best mode for this invention is when tot is set to 7 pixels. The purpose of this tolerance is two fold. First, it compensates for the possibility of target area underestimation. Secondly, it helps detect connected dark regions outside of the suspected shadow region, such as roads, to avoid false shadow detection.

The north boundary of the target, furthest away from the moving radar platform, is given by:

$$y_N = floor(min(y_n))$$

The five lines (or four, for low depression angles) defining the pentagon can then be defined as:

LINE 1 $(x_W, 1)$ to $(x_E, 1)$

If $-15°(=345°) < \theta < 15°$ or $75° < \theta < 105°$ or $165° < \theta < 195°$ or $255° < \theta < 285°$ LINE 2: $(x_W, 1)$ to $(x_W, y_N)$
LINE 3: $(x_E, 1)$ to $(x_E, y_N)$
LINE 4: $(x_W, y_N)$ to $(x_E, y_N)$ Else, if $15° \leq \theta \leq 75°$ $x_N = x_2, y_N = y_2$ $a_W = (y_3^c - y_2^c)/(x_3^c - x_2^c)$, $b_W = y_2^c - a_W x_2^c$, $y_W = floor[y_c - (a_W(x_3^c - tol) + b_W)]$ $a_E = (y_1^c - y_2^c)/(x_1^c - x_2^c)$, $b_E = y_2^c - a_E x_2^c$, $y_E = floor[y_c - (a_E(x_1^c + tol) + b_E)]$ Else, if $105° \leq \theta \leq 165°$ $x_N = x_3, y_N = y_3$ $a_W = (y_4^c - y_3^c)/(x_4^c - x_3^c)$, $b_W = y_3^c - a_W x_3^c$, $y_W = floor[y_c - (a_W(x_4^c - tol) + b_W)]$ $a_E = (y_2^c - y_3^c)/(x_2^c - x_3^c)$, $b_E = y_3^c - a_E x_3^c$, $y_E = floor[y_c - (a_E(x_2^c + tol) + b_E)]$ Else, if $195° \leq \theta \leq 255°$ $x_N = x_4, y_N = y_4$ $a_W = (y_1^c - y_4^c)/(x_1^c - x_4^c)$, $b_W = y_4^c - a_W x_4^c$, $y_W = floor[y_c - (a_W(x_1^c - tol) + b_W w)]$ $a_E = (y_3^c - y_4^c)/(x_3^c - x_4^c)$, $b_E = y_4^c - a_E x_4^c$, $y_E = floor[y_c - (a_E(x_3^c + tol) + b_E)]$ Else, if $285° \leq \theta \leq 345°$ $x_N = x_1, y_N = y_1$ $a_W = (y_2^c - y_1^c)/(x_2^c - x_1^c)$, $b_W = y_1^c - a_W x_1^c$, $y_W = floor[y_c - (a_W(x_2^c - tol) + b_W)]$ $a_E = (y_4^c - y_1^c)/(x_4^c - x_1^c)$, $b_E = y_1^c - a_E x_1^c$, $y_E = floor[y_c - (a_E(x_4^c + tol) + b_E)]$ LINE 2: $(x_W, 1)$ to $(x_W, y_W)$
LINE 3: $(x_E, 1)$ to $(x_E, y_E)$
LINE 4: $(x_W, y_W)$ to $(x_N, y_N)$
LINE 5: $(x_E, y_E)$ to $(x_N, y_N)$ Pentagonal area filter 307 discards all pixels outside the area determined by pentagonal area determination 303. Thus, all further operations are oriented towards the pixels within the pentagonal area A,B,C,D,E of FIG. 4. Due to the noisy nature of SAR images, the suspected shadow region is likely to be discontinuous. Thus, a morphological step using 2×2 dilation and majority filter 309 is applied. Here, first a 2×2 dilation is performed to bridge the discontinuous parts of the suspected shadow region, if any. Then, a majority window is used to further enhance the detected suspected shadow region, i.e. set a pixel to 1 if 5 or more of pixels of the 3×3 neighborhood are also 1. This second step cleans up spots inside the suspected shadow region and also reduces the size of extraneous regions.

Adjacent overlap test 311 includes a screening process that only considers the regions that are adjacent to the target, since an actual physical shadow is immediately adjacent in range behind a target, while a false dark region is not. Out of all detected regions, only the ones that overlap with the rectangular area bounded by $(x_W, y_N)$, $(x_E, y_N)$, $(x_W, y_N - y_{ov})$, $(x_E, y_N - y_{ov})$ are passed. A best mode implementation is for $y_{ov}$ to be set to 20 pixels. This is for target having a height of 10 feet, observed with a depression angle of 15 degrees. The geometrical relation indicates a target shadow in the slant plane of about 40 feet or 60 pixels. A 20 pixel vertical spacing, corresponding to $y_{ov}$, accounts for a significant part of the shadow extent.

The results of the adjacent overlap test 311 are used by edge pixel count 313 to further prevent false alarms due to a road or other dark regions from improperly extending the shadow region. False alarms are when a suspected target shadow is declared to belong to a particular target, when in fact it does not. In edge pixel count 313, the number of pixels are counted in each candidate shadow region that are on the two horizontal edges (with x coordinates $x_W$ or $x_E$). Those regions with more than 20 edge pixels are discarded. This parameter is based on a road width of 12 feet, corresponding to about 20 pixels.

The results from edge pixel unit 313 are presented to maximum area and minimum distance test 315 where the detected shadow region that is closest to the target while having the largest area (commensurate with the target) is identified based on the following criteria.

For the $k^{th}$ region, denote its west boundary as $x_W^{(k)}$, its east boundary as $x_E^{(k)}$, and its south boundary as $y_s^{(k)}$. The distance error for the $k^{th}$ region can be defined by $$e^{(k)} = |x_W - x_W^{(k)}| + |x_E - x_E^{(k)}| + |y_N - y_s^{(k)}| \qquad (3)$$

The area of the $k^{th}$ region is denoted as $a^{(k)}$. The distance error and the area of all K regions are defined by the vector forms $$e = [e^{(1)} \ldots e^{(K)}]^T \text{ and } a = [a^{(1)} \ldots a^{(K)}]^T \qquad (4)$$

The objective is to find a region that has the maximum area with the minimum distance from the target. This becomes a joint optimization problem in which the best region $\hat{k}$ is given by:

$$\hat{k} = \arg_k \min\left[\frac{e}{\|e\|} - \frac{a}{\|a\|}\right] \quad (5)$$

where $\|\cdot\|$ denotes the norm of a vector. The normalized form is used to provide fair weighting on the area and distance without using the actual values. When K=0, i.e. no region of the image has passed the various tests to this point, a suspected shadow is declared NOT PRESENT. For K≧1, the best region $\hat{k}$ is obtained from equation (5).

Once the best region is obtained from maximum area and minimum distance test 315, a final area threshold test 317 is performed to further test the suspected shadow cast by the target, as identified from equation (5). If the area of the best region $a^k$ is greater than or equal to 200 pixels, the presence of a shadow connected to the target is reported at the output. If less, no shadow is reported. This threshold is optimized for a relatively small target of 10 ft height, 10 ft width and 45 degree antenna depression angle. Length is not considered as the smaller width dimension is critical here. For this sample target, the vertical shadow extent on the slant plane is approximately 21 pixels. The horizontal shadow extent is approximately 15 pixels, resulting in a rectangular area of 315 pixels. Thus the 200 pixel threshold chosen for authenticating a suspected shadow target will be met taking into account the presence of noise and the actual, non-rectangular shape of the shadow image being thresholded.

A typical apparatus for use with a radar system, such as a Synthetic Aperture Radar (SAR) system, for authenticating that a suspected target shadow is cast by a target comprises a) a radar for gathering the radar image to be analyzed, said radar image containing said target and said suspected target shadow;
b) a computer for
   extracting a pentagonal area bounded by its pentagonal perimeter, the pentagonal area adjacent to said target within said radar image, said pentagonal area containing said suspected target shadow, said pentagonal area separate from said target and containing said suspected target shadow; and
   testing said suspected target shadow within said pentagonal area to authenticate that said suspected target shadow is cast by said target.

The computer applies a 2 by 2 dilation and majority filter to said suspected target shadow, conducts an adjacent overlap test, an edge pixel count, a maximum area and minimum distance test, as well as an area threshold test.

Typically, the computer thresholds the radar image to obtain a binary image therefrom, thereby reducing memory requirements for performing said testing.

All references cited in this document are incorporated herein in their entirety by reference.

Although presented in exemplary fashion employing specific embodiments, the disclosed structures are not intended to be so limited. For example, although specific threshold values are used as examples for particular applications, other threshold values can be used by deriving new values from the concepts described by the invention herein.

Those skilled in the art will also appreciate that for example IFSAR, SAR, or real beam radar returns can be used with the present invention, as well as returns from SONAR pings. Thus, numerous changes and modifications could be made to the embodiment described herein without departing in any way from the invention. These changes and modifications and all obvious variations of the disclosed embodiment are intended to be embraced by the claims to the limits set by law.

What is claimed is:

1. A method for using a radar system for authenticating that a suspected target shadow is cast by a target, comprising the steps of:

generating a radar image using radar returns from said radar, said radar image containing said target and said suspected target shadow;

forming a pentagonal perimeter adjacent to said target within said radar image, said pentagonal perimeter containing said suspected target shadow, said pentagonal perimeter separating said target from said suspected target shadow; and testing said suspected target shadow within said pentagonal perimeter to authenticate that said suspected target shadow is cast by said target.

2. A method as described in claim 1 wherein said testing step further comprises applying a 2 by 2 dilation and majority filter to said target shadow.

3. A method as described in claim 1 wherein said testing step further comprises conducting an adjacent overlap test.

4. A method as described in claim 1 wherein said testing step further comprises conducting an edge pixel count.

5. A method as described in claim 1 wherein said testing step further comprises computing a maximum area and minimum distance test.

6. A method as described in claim 1 wherein said testing step further comprises conducting an area threshold test.

7. A method as described in claim 1 wherein said testing step further comprises thresholding said radar image to obtain a binary image therefrom.

8. An apparatus for use with a radar system for authenticating that a suspected target shadow is cast by a target, comprising:

a radar for gathering a radar image, said radar image containing said target and said suspected target shadow;

a computer for extracting a pentagonal area adjacent to said target within said radar image, said pentagonal area containing said suspected target shadow, said pentagonal area separate from said target and containing said suspected target shadow; and for testing said suspected target shadow within said pentagonal thereby authenticating that said suspected target shadow is cast by said target.

9. An apparatus as described in claim 8 wherein said computer further applies a 2 by 2 dilation and majority filter to said target shadow.

10. An apparatus as described in claim 8 wherein said computer further conducts an adjacent overlap test.

11. An apparatus as described in claim 8 wherein said computer further conducts an edge pixel count.

12. An apparatus as described in claim 8 wherein said computer performs a maximum area and minimum distance test.

13. An apparatus as described in claim 8 wherein said computer performs an area threshold test.

14. An apparatus as described in claim 8 wherein said computer thresholds said radar image to obtain binary image therefrom.

* * * * *